Sept. 14, 1948.  B. P. ROBERTSON  2,449,510
LUBRICANTS
Filed May 7, 1946
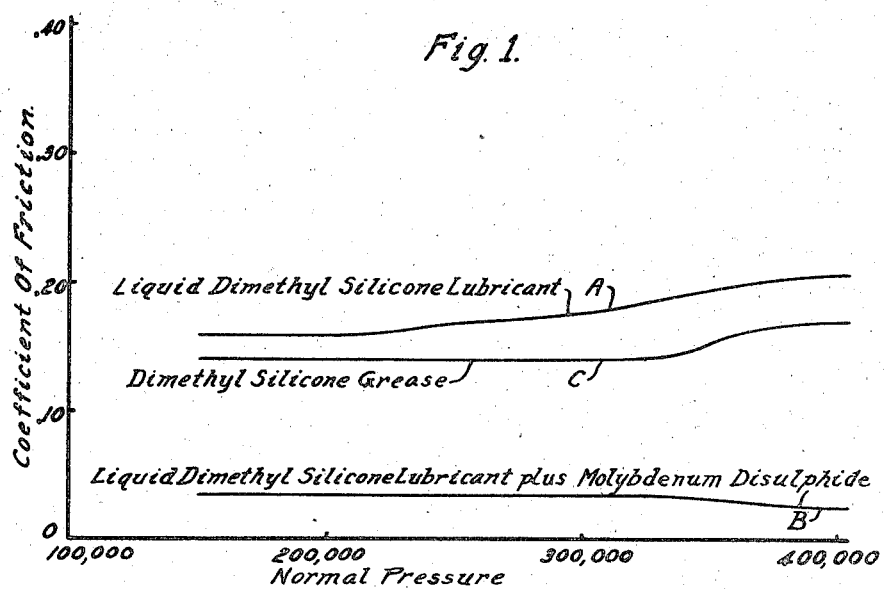
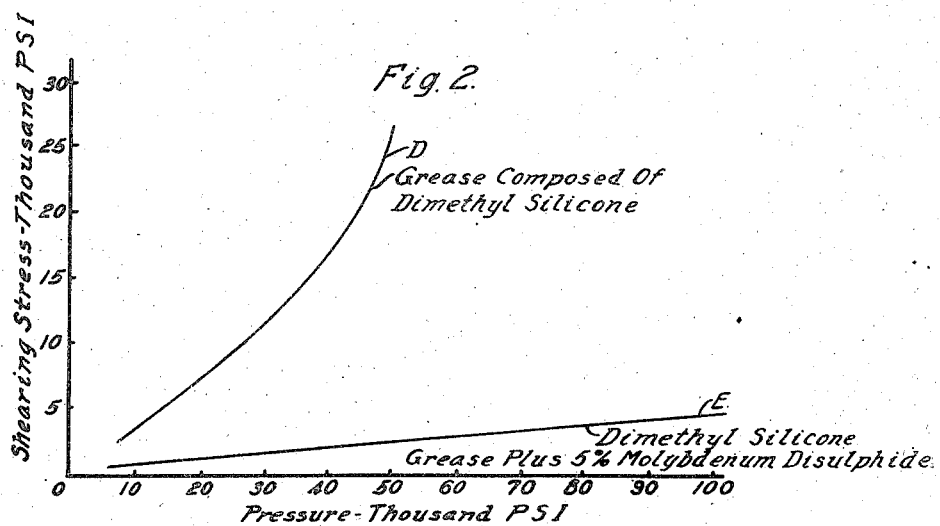
INVENTOR
Billy P. Robertson Patented Sept. 14, 1948

2,449,510

UNITED STATES PATENT OFFICE 2,449,510

LUBRICANTS

Billy P. Robertson, Pittsburgh, Pa., assignor to Westinghouse Electric Corporation, East Pittsburgh, Pa., a corporation of Pennsylvania Application May 7, 1946, Serial No. 667,773

5 Claims. (Cl. 252—49.7)

This invention relates to novel lubricant compositions. The compositions are characterized by ability to withstand high temperatures and excellent anti-friction properties at extreme pressures.

There have been disclosed to the art a number of fluid compositions consisting essentially of organo-silicon oxide polymers, commonly known as silicones, having the unit formula:

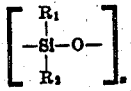

where $R_1$ and $R_2$ are alkyl radicals and $x$ is greater than 3. Both $R_1$ and $R_2$ may consist of such alkyl groups as methyl, ethyl, propyl, isopropyl, butyl and amyl. The fluids may have viscosities of from less than 50 centistokes to 5000 centistokes and higher. The most useful fluids for the purpose of this invention are those in which $x$ has a value of 10 or more. The terminal groups in each molecule of the polymer may be either trialkyl silicon groups or dialkyl silicon hydroxyl groups. However, in some cases, the polymers are believed to consist of rings in which no terminal groups are present. In any event, it is undesirable to have any significant amount of monoalkyl silicon groups present, since such groups tend to cause cross-linking and result in resinous or solid materials being produced. The best results for the purpose of this invention have been obtained with compositions in which dimethyl silicone fluids are employed. While the dialkyl silicon oxide polymeric fluids have many unusual characteristics, such, for example, as an extremely flat temperature-viscosity curve, they have been found to be unsatisfactory as lubricants due to a lack of film strength and anti-friction values as low as those possessed by ordinary petroleum lubricants. The purpose of this invention is to produce useful lubricants from such silicone fluids.

The object of this invention is to prepare a lubricant composition having excellent anti-friction properties combined with the thermal stability of silicones.

Other objects of the invention will, in part, be obvious, and will, in part, appear hereinafter.

For a fuller understanding of the nature and objects of the invention, reference should be had to the following detailed description and drawing, in which:

Figures 1 and 2 are graphs.

It has been discovered that fluid dialkyl silicones may be combined with colloidally fine solid compounds selected from the class consisting of the disulphides, selenides, and tellurides of molybdenum, tungsten, and titanium. A minimum amount equal to 0.1% of the weight of the fluid dialkyl silicone is required to produce the lubricants of this invention. The finely divided solid should be added in an amount equal to from 2% to 10% or more of the weight of the dialkyl silicone to achieve optimum properties. The compound molybdenum disulphide will be referred to hereinafter specifically as typical of all the other compounds that may be added to the polymeric silicones.

Referring to Figure 1 of the drawing, there is illustrated the values of the coefficient of friction under heavy normal pressures for a liquid dimethyl silicone lubricant with molybdenum disulphide combined therewith. The curve A was obtained by applying a liquid dimethyl silicone having a viscosity of 1000 centistokes to a standard friction-testing machine provided with four half-inch steel balls disposed in a cluster with one of the balls revolving at a speed of 1.8 revolutions per minute with respect to the others. It will be noted that the coefficient of friction increased as the normal pressure on the balls increased. Furthermore, all the friction values are relatively high under the test conditions. As shown in curve B, a composition composed of 50 grams of the same dimethyl silicone lubricant as employed in determining curve A, combined with 90 grams of colloidally fine molybdenum disulphide, gave remarkably improved results in the same test machine. The coefficient of friction is not only relatively uniform, but is of a value which is favorably comparable with that obtained with the best petroleum lubricants available to the trade.

The curve C in Fig. 1 of the drawing is that secured by testing a grease prepared from a fluid dimethyl silicone combined with silica gel to form a grease. It will be noted that the improvement by incorporating silica gel is relatively meager. Therefore, molybdenum disulphide and other related solid compounds produce an unexpected result by converting a poor lubricant to an excellent lubricant.

Referring to Fig. 2 of the drawing, there are illustrated a plurality of curves obtained by plotting shearing stress against pressure for a number of different silicone compositions. The curve D is that obtained by plotting the shearing stress against pressure obtained by testing a grease composed of dimethyl silicone and colloidal silica equal to approximately 50% of the weight of the dimethyl silicone fluid. The curve D indicates a characteristic of disproportionate increase in shearing stresses that would be regarded as unsatisfactory as far as lubrication is concerned. The sharp rise with increase in pressure would be undesirable in applying the grease since many lubricating applications produce pressures of the order shown in the graph. The same grease from which the data of curve D were obtained was combined with 5% colloidally fine molybdenum disulphide and tested in the same way. The curve E indicates the unusual and marked improvement secured. The lubricating properties of the composition containing the molybdenum disulphide are satisfactory and would be welcomed by the trade.

In preparing the improved compositions of this invention, the solid material, such as molybdenum disulphide, if relatively pure and free from abrasives, may be ball milled in the presence of the dialkyl silicone for a period of time of from twenty-four to forty-eight hours, or longer, until a relatively stable suspension is produced. The suspension may be diluted with more dialkyl silicone fluid to produce a composition of any desired consistency. For the purpose of this invention, the solids are the highly purified solids prepared in accordance with the patent of E. B. Kaercher, No. 2,367,946. The purified molybdenum disulphide and the like produced by the process of that patent is already in a colloidal state of division and only a brief ball milling with the dialkyl silicone is necessary to secure a relatively permanent suspension. A suspending agent, such as diglycol stearate or gum arabic in an amount equal to 1% of the weight of the molybdenum disulphide, may be added in order to maintain the suspension over a prolonged period of storage, though this is not absolutely necessary.

In preparing a grease-like lubricant composition, 100 parts by weight of a polymeric dialkyl silicon oxide fluid is admixed with from 10 to 100 parts by weight of colloidal silica, such as silica gel, and from one-tenth part to a hundred parts by weight of molybdenum disulphide or other compound. A brief ball milling operation is sufficient to produce a suitable grease for various applications.

The oils and greases have been tested at temperatures of as high as 300° F. for prolonged periods of time without any substantial deterioration thereof. The outstanding low coefficient of friction and other properties have been maintained even after many hours use of the lubricants at such elevated temperatures.

Specific examples of other colloidal solids from the class above mentioned which are useful for converting relatively unsatisfactory silicone fluids to good lubricants are tungsten disulphide, titanium sulphide, titanium telluride, molybdenum selenide and tungsten selenide.

Since certain obvious changes may be made in the above procedure and different embodiments of the invention could be made without departing from the scope thereof, it is intended that all matter contained in the above description and drawing shall be taken in connection with the accompanying claims and not in a limiting sense.

I claim as my invention:

1. A lubricant comprising, in combination, a polymeric silicon oxide having the unit formula:

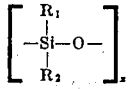

where $R_1$ and $R_2$ are saturated aliphatic radicals and $x$ is greater than 3, the polymeric silicon oxide having oily characteristics, and from 0.1% to about 180% of the weight of the polymeric silicon oxide of a finely divided solid compound selected from the class consisting of the disulphides, selenides and tellurides of molybdenum, tungsten, and titanium.

2. A lubricant comprising, in combination, a polymeric dimethyl silicon oxide substantially free from monomethyl silicon oxide groups, the polymeric dimethyl silicon oxide having lubricating characteristics, and from 0.1% to about 180% of the weight of the polymeric silicon oxide of a finely divided solid compound selected from the class consisting of the disulphides, selenides and tellurides of molybdenum, tungsten, and titanium.

3. A lubricant comprising, in combination, a polymeric dimethyl silicon oxide substantially free from monomethyl silicon oxide groups, the polymeric dimethyl silicon oxide having lubricating characteristics, from 0.1% to about 180% of the weight of the polymeric silicon oxide of a finely divided solid compound selected from the class consisting of the disulphides, selenides and tellurides of molybdenum, tungsten, and titanium, and a suspending agent for the molybdenum disulphide.

4. A high temperature grease comprising, in combination, a polymeric silicon oxide having the unit formula:

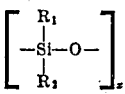

where $R_1$ and $R_2$ are saturated aliphatic radicals and $x$ is greater than 3, the polymeric silicon oxide having oily characteristics, and from 10% to 100% of the weight of the polymeric silicon oxide of silica in colloidal form, and from 0.1% to about 180% of the weight of the polymeric silicon oxide of a finely divided solid compound selected from the class consisting of the disulphides, selenides and tellurides of molybdenum, tungsten, and titanium.

5. A high temperature grease comprising, in combination, a polymeric dimethyl silicon oxide substantially free from monomethyl silicon oxide groups, the polymeric dimethyl silicon oxide having lubricating characteristics, and from 10% to 100% of the weight of the polymeric silicon oxide of silica in colloidal form, and from 0.1% to about 180% of the weight of the polymeric silicon oxide of a finely divided solid compound selected from the class consisting of the disulphides, selenides and tellurides of molybdenum, tungsten, and titanium.

BILLY P. ROBERTSON.